United States Patent [19]

Hirai

[11] Patent Number: 5,446,785
[45] Date of Patent: Aug. 29, 1995

[54] TELEPHONE TERMINAL EQUIPMENT IN WHICH TELEPHONE NUMBERS OF CALLERS ARE DISPLAYED

[75] Inventor: Yuji Hirai, Fukuoka, Japan

[73] Assignee: Matsushita Electric Industrial Co., Ltd., Japan

[21] Appl. No.: 66,197

[22] Filed: May 25, 1993

[30] Foreign Application Priority Data

May 27, 1992 [JP] Japan .................................. 4-134692
Jun. 12, 1992 [JP] Japan .................................. 4-153570

[51] Int. Cl.$^6$ ...................... H04M 1/69; H04M 1/56; H04M 15/06
[52] U.S. Cl. ...................... 379/142; 379/67; 379/88
[58] Field of Search .................... 379/67, 88, 130, 127, 379/131, 142, 201, 207

[56] References Cited

U.S. PATENT DOCUMENTS

| | | | |
|---|---|---|---|
| 5,029,196 | 7/1991 | Morganstein | 379/67 |
| 5,103,444 | 4/1992 | Jolissant | 379/142 X |
| 5,121,423 | 6/1992 | Morihiro et al. | 375/142 |
| 5,200,994 | 4/1993 | Sassano et al. | 375/142 |
| 5,245,651 | 9/1993 | Takeshim et al. | 375/142 X |
| 5,265,145 | 11/1993 | Lim | 375/142 X |
| 5,309,504 | 5/1994 | Morganstein | 375/142 X |

Primary Examiner—Stephen Chin
Assistant Examiner—Paul Loomis
Attorney, Agent, or Firm—Parkhurst, Wendel & Rossi

[57] ABSTRACT

A telephone terminal equipment consists of a ring signal detecting circuit for detecting ring signals transferred from a caller, a ring tone generating circuit for generating ring tones output from a speaker when the ring signals are detected in the ring tone generating circuit, a telephone number detecting circuits for detecting a telephone number of the caller, a memory circuit for storing the telephone number detected in the telephone number detecting circuit, a ring signal termination detecting circuit for detecting termination of the ring signals in cases where a subscriber make no response to the caller, a control circuit for controlling the memory circuit to store a no-response code in relation to the telephone number in cases where the termination of the ring signals is detected in the ring signal termination detecting circuit, a displaying circuit for displaying both the telephone number and a no-response mark relating to the no-response code stored together in the memory circuit. Because both the telephone number and the no-response mark are displayed in the displaying circuit, the subscriber can judge whether a response to the caller is required.

17 Claims, 10 Drawing Sheets

| ORDER OF INFORMATION | TELEPHONE NUMBERS | RESPONSE INFORMATION |
|---|---|---|
| 1 | 000 0000 | 1 |
| 2 | 111 1111 | 0 |
| 3 | 222 2222 | 1 |
| ⋮ | ⋮ | ⋮ |

| NO-RESPONSE MARKS | TELEPHONE NUMBERS |
|---|---|
| Ld | 000-0000  Nt1 |
| Mn ★ | 111-1111  Nt2 |
| | 222-2222  Nt3 |
| | ⋮ |

| NO-RESPONSE MARKS | TELEPHONE NUMBERS |
|---|---|
| | 000-0000 |
| ★ | 111-1111 |
| | 222-2222 |
| | ⋮ |

TELEPHONE TERMINAL EQUIPMENT IN WHICH TELEPHONE NUMBERS OF CALLERS ARE DISPLAYED

BACKGROUND OF THE INVENTION

1. FIELD OF THE INVENTION

The present invention relates generally to a telephone terminal equipment in which telephone numbers of callers are displayed, and more particularly to a telephone terminal equipment in which telephone numbers relating to no-response are explicitly displayed.

2. DESCRIPTION OF THE RELATED ART

When a caller give a telephone call to a subscriber, a ring signal and a piece of telephone number data indicating a telephone number of the caller are conventionally sent together to the subscriber. The telephone number data of the caller is added to the ring signal at a telephone exchange as a service. Thereafter, the telephone number of the caller is displayed on a telephone set of the subscriber after the telephone number data is decoded to the telephone number of the caller. Therefore, the subscriber can identify the caller before the subscriber takes up a handset of the telephone unit to place a call.

Accordingly, an unnecessary telephone communication with the caller can be prevented to save the time because the subscriber can identify the caller without communicating with the caller.

Also, because the telephone number of the caller is displayed on the telephone set of the subscriber, usage of telephone communication for the wrong purpose can be reduced.

Previously Proposed Art

A conventional telephone unit is described with reference to FIG. 1.

FIG. 1 is a block diagram of a conventional telephone unit.

As shown in FIG. 1, a conventional telephone unit 11 at a subscriber's side is provided with a ring signal detecting circuit 12 for detecting a ring signal transferred from a telephone exchange (not shown) through telephone lines 13, a ringing tone generating circuit 14 for generating ringing tones when the ring signal is detected in the ring signal detecting circuit 12, a speaker 15 for outputting the ringing tones generated in the ringing tone generating circuit 14, a telephone number detecting circuit 16 for detecting a piece of telephone number data indicating a telephone number of a caller, a control circuit 17 including a microcomputer for decoding the telephone number data to the telephone number, a memory circuit 18 for storing the telephone number decoded in the control circuit 17 under control of the control circuit 17, a displaying circuit 19 including a liquid crystal display (LCD) for displaying the telephone number decoded in the control circuit 17 under control of the control circuit 17, and a handset 20 detachably attached on a hook switch 21.

In the above configuration, the conventional telephone unit 11 is usually in a waiting mode which corresponds to a on-hook condition in which the handset 20 is attached on the hook switch 21 to wait for a telephone call. When a caller dials to give a telephone call to the subscriber, a dial signal is transferred to the telephone exchange. Thereafter, the conventional telephone unit 11 at the subscriber's side is specified in the telephone exchange because the dial signal designates the unit 11. Therefore, a series of ring signals is generated in the telephone exchange, and a piece of telephone number data indicating the telephone number of the caller is added so as to follow a first ring signal of the ring signals in the telephone exchange. Thereafter, the ring signals and the telephone number data are transferred to the conventional telephone unit 11 through the telephone lines 13. Therefore, each of the ring signals is intermittently detected in the ring signal detecting circuit 12, and the telephone number data indicating the telephone number of the caller is detected in the telephone number detecting circuit 16.

When the first ring signal is detected in the ring signal detecting circuit 12, a detecting signal is transferred from the ring signal detecting circuit 12 to the control circuit 17. Also, the detecting signal is transferred to the ringing tone generating circuit 14 each time one of the ring signals is detected in the ring signal detecting circuit 12. Thereafter, a ringing tone is generated in the ringing tone generating circuit 14 each time the detecting signal is received in the ringing tone generating circuit 14. Therefore, ringing tones are intermittently output from the speaker 15.

When the telephone number data is detected in the telephone number detecting circuit 16, the telephone number data is transferred to the control circuit 17. In this case, because the detecting signal has been already received in the control circuit 17, the telephone number data is promptly decoded to a telephone number of the caller, and the telephone number is stored in the memory circuit 18 under the control of the control circuit 18. Also, the telephone number is promptly displayed on a liquid crystal display of the display circuit 19.

The conventional telephone unit 11 is additionally provided with an interface circuit 22 through which the handset 20 is connected with the telephone lines 13 under control of the control circuit 17, a receiving circuit 23 for transmitting an aural signal transferred from the caller to a receiver of the handset 20 through the telephone lines 13 and the interface circuit 22, a transmitting circuit 24 for transmitting another aural signal of the subscriber input in a microphone of the handset 20 to the caller through the interface circuit 22 and the telephone lines 13, and a displaying switch 25 operated by the subscriber to display all of telephone numbers stored in the memory circuit 18 on the liquid crystal display of the displaying circuit 19.

In the above configuration, in cases where the handset 20 is in the on-hook condition, the handset 20 is disconnected with the telephone lines 13 under control of the control circuit 17. In contrast, when the subscriber hears the ringing tones output from the speaker 15, the subscriber looks at the telephone number displayed on the liquid crystal display of the displaying circuit 19 and takes up the handset 20 attached on the hook switch 21 to talk with the caller. At this time, the hook switch 21 is switched on, and a switch-on signal is transferred from the hook switch 21 to the control circuit 17. Therefore, the handset 20 is set to an off-hook condition. That is, the interface circuit 22 is controlled by the control circuit 17 to connect the handset 20 to the telephone lines 13. Also, the generation of the ringing tones in the ringing tone generating circuit 14 is stopped under control of the control circuit 17. Therefore, the output of the ringing tones in the speaker 15 is stopped.

When the handset 20 is set to the off-hook condition, an aural signal indicating a voice of the caller is transferred to the receiving circuit 23 through the interface circuit 22 so that the voice of the caller is output from the receiver of the handset 20. Also, a voice of the subscriber received in the microphone of the handset 20 is converted into an aural signal of the subscriber in the transmitting circuit 24, and the sound signal of the subscriber is transferred to the caller through the interface circuit 22 and the telephone lines 13. Therefore, the subscriber can talk with the caller in a two-way conversation.

In addition, a plurality of telephone numbers of callers are automatically stored one by one in the memory circuit 18 in the order of telephone calls regardless of whether the handset 20 is set in the off-hook condition. Also, when the subscriber leaves his house, the subscriber can set the conventional telephone unit 11 from the waiting mode to an absent mode. Therefore, in cases where the conventional telephone unit 11 is in the absent mode, each of the telephone numbers is automatically stored in the memory circuit 18 with a reference code indicating the absent mode. In this case, when the subscriber returns home, the subscriber can identify the telephone numbers stored in the absent mode by pushing down the displaying switch 25. In other words, the subscriber can distinguish the telephone numbers stored in the absent mode from the telephone numbers stored in the waiting mode.

Problems to be Solved by the Invention

However, in cases where the subscriber often leaves his house, it is troublesome to set the conventional telephone unit 11 to the absent mode. Therefore, the subscriber does not set the unit 11 to the absent mode as a practical matter when the subscriber leaves his house. In this case, when the subscriber is absent, the subscriber makes no response to telephone calls of callers having first telephone numbers. Therefore, the first telephone numbers relating to no-response are automatically stored one by one in the memory circuit 18 in the waiting mode. In contrast, when the subscriber is in home, the subscriber makes a response to each of telephone calls of callers having second telephone numbers. Therefore, the second telephone numbers corresponding to responded telephone calls are automatically stored one by one in the memory circuit 18 in the waiting mode. As a result, the first telephone numbers relating to no-response and the second telephone numbers corresponding to responded telephone calls are mingled together.

Accordingly, because all of the telephone numbers stored in the memory circuit 18 are displayed in the same waiting mode, there is a first drawback that the subscriber cannot distinguish the first telephone numbers relating to no-response from the second telephone numbers corresponding to responded telephone calls. That is, even though the subscriber intends to give telephone calls to the callers having the first telephone numbers relating to no-response, the subscriber cannot select the first telephone numbers.

Also, there is a case that the conventional telephone unit 11 is additionally provided with a tape recorder which automatically record a voice of a caller in the absent mode. In this case, even though the caller gives a telephone call to the subscriber when the subscriber is absent, the subscriber can hear the voice of the caller with the tape recorder when the subscriber returns home.

However, the telephone number of the caller is stored in the memory circuit 19 regardless of whether the voice of the caller is recorded in the tape recorder. Accordingly, even though the conventional telephone unit 11 is set to the absent mode each time the subscriber leaves his house, there is a second drawback that the subscriber cannot distinguish telephone numbers of callers whose voices are recorded in the tape recorder from telephone numbers of callers whose voices are not recorded in the tape recorder.

SUMMARY OF THE INVENTION

A first object of the present invention is to provide, with due consideration to the drawbacks of such a conventional telephone unit, a telephone terminal equipment in which a subscriber distinguishes telephone numbers relating to no-response telephone calls from telephone numbers relating to responded telephone calls.

Also, a second object of the present invention is to provide a telephone terminal equipment in which a subscriber distinguishes telephone numbers of callers whose voices are recorded in a tape recorder from telephone numbers of callers whose voices are not recorded in the tape recorder.

The first object is achieved by the provision of a telephone terminal equipment, comprising:

ring signal detecting means for detecting ring signals relating to a telephone call of a caller to a subscriber;

telephone number detecting means for detecting a telephone number of the caller transferred with the ring signals detected by the ring signal detecting means;

memory means for storing the telephone number detected by the telephone number detecting means;

control means for controlling the memory means to store no-response information in relation to the telephone number in the memory means, the no-response information indicating that the subscriber makes no response to the telephone call of the caller; and displaying means for displaying both the telephone number stored in the memory means and the no-response information relating to the telephone number in the memory means.

In the above configuration, when a caller gives a telephone call to a subscriber, a series of ringing signals is provided to the telephone terminal equipment at a subscriber's side through telephone lines. Therefore, the ring signals are detected by the ring signal detecting means. Thereafter, ring tones are intermittently output from a speaker to inform the subscriber of the telephone call. Also, a telephone number of the caller is transferred to the telephone terminal equipment. Therefore, the telephone number is detected in the telephone number detecting means, and the telephone number is stored in the memory means.

Thereafter, in cases where the subscriber does not take up the handset, the caller stops giving the telephone call to the subscriber after a time. In this case, no-response information is stored in the memory means while relating to the telephone number under the control of the control means. Also, the telephone number and the no-response information stored together in the memory means are displayed in the displaying means.

Therefore, in cases where a large number of telephone calls are given one by one to the telephone terminal equipment at a subscriber's side, the no-response information is displayed with only the telephone numbers relating to the telephone calls to which the subscriber make no response.

Accordingly, the subscriber can easily judge whether or not the subscriber makes a response to each of the telephone calls relating to the telephone numbers displayed in the displaying means.

In addition to the above configuration, the telephone terminal equipment includes ring signal termination detecting means for detecting termination of the ring signals detected by the ring signal detecting means, the no-response information being stored in the memory means under the control of the control means in cases where the termination of the ring signals is detected in the ring signal termination detecting means.

In the above configuration, in cases where the subscriber does not take up the handset when the caller gives a telephone call to the subscriber, the caller stops giving the telephone call to the subscriber after a time so that the ring signals are not detected any more in the ring signal detecting means. Therefore, the termination of the ring signal is detected in the ring signal termination detecting means, and no-response information is stored in the memory means while relating to the telephone number under the control of the control means. Also, the telephone number and the no-response information stored together in the memory means are displayed in the displaying means.

In contrast, in cases where the subscriber takes up a handset to make a response to the telephone call when the caller gives a telephone call to the subscriber, termination of the ring signals detected in the ring signal detecting means is not detected in the ring signal termination detecting means. Therefore, any piece of no-response information is not stored in the memory means. That is, only the telephone number is stored in the memory means. Also, only the telephone number stored in the memory means is displayed in the displaying means.

Therefore, in cases where a large number of telephone calls are given one by one to the telephone terminal equipment at a subscriber's side, the no-response information is displayed with only the telephone numbers relating to the telephone calls to which the subscriber make no response.

Accordingly, the subscriber can easily judge whether or not the subscriber makes a response to each of the telephone calls relating to the telephone numbers displayed in the displaying means.

Also, the first object is achieved by the provision of a telephone terminal equipment, comprising:
  ring signal detecting means for detecting ring signals relating to a telephone call of a caller to a subscriber;
  telephone number detecting means for detecting a telephone number of the caller transferred with the ring signals detected by the ring signal detecting means;
  memory means for storing the telephone number detected by the telephone number detecting means;
  voice recognizing means for recognizing a voice given in a telephone conversation between the subscriber and the caller;
  elapsed time counting means for counting an elapsed time of the telephone conversation recognized in the voice recognizing means;
  judging and controlling means for judging whether or not the elapsed time counted in the elapsed time counting means reaches a minimum conversation time and controlling the memory means to store no-response information in relation to the telephone number in the memory means in cases where the elapsed time counted in the elapsed time counting means reaches the minimum conversation time; and
  displaying means for displaying the telephone number stored in the memory means and the no-response information stored in the memory means under control of the judging and controlling means.

In the above configuration, when a caller gives a telephone call to a subscriber, a series of ringing signals is provided to the telephone terminal equipment at a subscriber's side through telephone lines. Therefore, the ring signals are detected by the ring signal detecting means one by one. Thereafter, ring tones are intermittently output from a speaker to inform the subscriber of the telephone call. Also, a telephone number of the caller is transferred to the telephone terminal equipment. Therefore, the telephone number is detected in the telephone number detecting means, and the telephone number is stored in the memory means.

Thereafter, when the subscriber takes up a handset, a telephone conversation is started. At this time, a voice given in the telephone conversation is recognized in the voice recognizing means, and an elapsed time of the telephone conversation is counted in the elapsed time counting means.

Thereafter, in cases where the voice given in the telephone conversation is not recognized any more in the voice recognizing means before the elapsed time reaches a minimum conversation time it is judged in the judging and controlling means that the telephone conversation is unsuccessfully over. Therefore, a piece of no-response information is stored in the memory means in relation to the telephone number. Also, the telephone number and the no-response information stored together in the memory means are displayed in the displaying means.

In contrast, in cases where the voice given in the telephone conversation is continuously recognized in the voice recognizing means until the elapsed time reaches the minimum conversation time, it is judged in the judging and controlling means that the telephone conversation is successfully over. In this case, any piece of no-response information is not stored in the memory means. Thereafter, only the telephone number stored in the memory means is displayed in the displaying means.

Therefore, in cases where a large number of telephone calls are given one by one to the telephone terminal equipment at a subscriber's side, the no-response information is displayed with the telephone numbers relating to the telephone calls in which the telephone conversation is unsuccessfully over.

Accordingly, the subscriber can easily judge whether or not the telephone conversation is successfully performed in each of the telephone calls relating to the telephone numbers displayed in the displaying means.

Also, the first object is achieved by the provision of a telephone terminal equipment, comprising:
  ring signal detecting means for detecting ring signals relating to a telephone call of a caller to a subscriber;
  telephone number detecting means for detecting a telephone number of the caller transferred with the ring signals detected by the rink signal detecting means;

memory means for storing the telephone number detected by the telephone number detecting means;

ring signal termination detecting means for detecting termination of the ring signals detected by the ring signal detecting means in cases where the caller stops giving the telephone call to the subscriber before the subscriber makes a response to the telephone call of the caller;

voice recognizing means for recognizing a voice given in a telephone conversation between the subscriber and the caller in cases where the subscriber makes a response to the telephone call of the caller before the caller stops giving the telephone call to the subscriber;

elapsed time counting means for counting an elapsed time of the telephone conversation recognized in the voice recognizing means;

judging means for judging whether or not the elapsed time counted in the elapsed time counting means reaches a minimum conversation time;

control means for controlling the memory means to store a piece of no-response information in relation to the telephone number in the memory means in cases where the termination of the ring signals detected in the ring signal detecting means is detected in the ring signal termination detecting means or in cases where the elapsed time counted in the elapsed time counting means does not reach the minimum conversation time, the no-response information indicating that the subscriber makes no response to the telephone call of the caller or that the telephone conversation is unsuccessfully over; and displaying means for displaying the telephone number stored in the memory means and the no-response information stored in the memory means.

In the above configuration, when a caller gives a telephone call to a subscriber, a series of ringing signals is provided to the telephone terminal equipment at a subscriber's side through telephone lines. Therefore, the ring signals are detected by the ring signal detecting means one by one. Thereafter, ring tones are intermittently output from a speaker to inform the subscriber of the telephone call. Also, a telephone number of the caller is transferred to the telephone terminal equipment. Therefore, the telephone number is detected in the telephone number detecting means, and the telephone number is stored in the memory means.

Thereafter, in cases where the caller stops giving the telephone call to the subscriber before the subscriber makes a response to the telephone call of the caller, the ring signals are not detected any more in the ring signal detecting means. Therefore, the termination of the ring signal is detected in the ring signal termination detecting means, and a piece of no-response information is stored in the memory means under the control of the control means in relation to the telephone number stored in the memory means. In this case, the no-response information indicates that the subscriber makes no response to the telephone call of the caller.

In contrast, in cases where the subscriber makes a response to the telephone call of the caller before the caller stops giving the telephone call to the subscriber, a telephone conversation is started. At this time, a voice given in the telephone conversation is recognized in the voice recognizing means, and an elapsed time of the telephone conversation is counted in the elapsed time counting means. Thereafter, in cases where the voice given in the telephone conversation is not recognized any more in the voice recognizing means before the elapsed time reaches a minimum conversation time, it is judged in the judging means that the elapsed time counted in the elapsed time counting means does not reach the minimum conversation time. Therefore, a piece of no-response information is stored in the memory means in relation to the telephone number under the control of the control means. In this case, the no-response information indicates that the telephone conversation is unsuccessfully over.

Thereafter, the telephone number and the no-response information stored together in the memory means are displayed in the displaying means.

Therefore, in cases where a large number of telephone calls are given one by one to the telephone terminal equipment at a subscriber's side, the no-response information is displayed with only the telephone numbers relating to the telephone calls to which the subscriber make no response or unsuccessful conversation is performed.

Accordingly, the subscriber can easily judge whether or not a response call to the caller is required to each of the telephone calls relating to the telephone numbers displayed in the displaying means.

The second object is achieved by the provision of a telephone terminal equipment, comprising:

ring signal detecting means for detecting ring signals relating to a telephone call of a caller to a subscriber;

telephone number detecting means for detecting a telephone number of the caller transferred with the ring signals detected by the ring signal detecting means;

memory means for storing the telephone number detected by the telephone number detecting means;

response message sending means for sending out a response message of the subscriber to the caller in cases where the ring signals are detected in the ring signal detecting means, the response message being recorded in a recorder in advance;

incoming message recording means for recording an incoming message of the caller after the response message of the subscriber is sent out from the response message sending means, the incoming message of the caller being transferred through telephone lines in a form of aural signals;

aural signal distinguishing means for distinguishing the aural signals forming the incoming message of the caller recorded in the incoming message recording means from various types of signals transferred through the telephone lines;

judging and control means for judging whether or not the aural signals are distinguished in the aural signal distinguishing means, controlling the memory means to store a piece of recording information in relation to the telephone number stored in the memory means in cases where it is judged that the aural signals are distinguished in the aural signal distinguishing means, and controlling the incoming message recording means to stop recording the incoming message of the caller in cases where it is Judged that the aural signals are not distinguished any more in the aural signal distinguishing means; and displaying means for displaying both the telephone number stored in the memory means and the recording information relating to the telephone number in the memory means.

In the above configuration, when a caller gives a telephone call to a subscriber, a series of ringing signals is provided to the telephone terminal equipment at a subscriber's side through telephone lines. Therefore, the ring signals are detected by the ring signal detecting means one by one. Thereafter, ring tones are intermittently output from a speaker to inform the subscriber of the telephone call. Also, a telephone number of the caller is transferred to the telephone terminal equipment. Therefore, the telephone number is detected in the telephone number detecting means, and the telephone number is stored in the memory means.

Thereafter, in cases where the telephone call is given to the subscriber in the absence of the subscriber, the subscriber cannot take up a handset. In this case, because a response message of the subscriber is recorded in a recorder of the response message sending means, the response message of the subscriber is automatically sent out to the caller from the response message sending means. Therefore, the caller is informed of the subscriber's absence. In addition, after the response message of the subscriber is automatically sent out to the caller, the incoming message recording means is automatically operated to record an incoming message of the caller. Therefore, in cases where the caller intends to give the incoming message of the caller to the subscriber, the incoming message of the caller can be recorded in a recorder of the incoming message recording means. The incoming message of the caller is transferred through the telephone lines in the form of aural signals.

Thereafter, the aural signal distinguishing means is automatically operated to distinguish the aural signals forming the incoming message of the caller from various types of signals transferred through the telephone lines. The various types of signals are generally the aural signals, busy tone signals, and silent tone signals, and each of the various types of signals is transferred by turns. During the operation of the incoming message recording means, it is judged in the judging and control means whether or not the aural signals are distinguished in the aural signal distinguishing means.

When it is Judged that the aural signals are distinguished in the aural signal distinguishing means, the judgement means that the incoming message of the caller is recorded in the recorder of the incoming message recording means. Therefore, a piece of recording information is stored in the memory means in relation to the telephone number under the control of the judging and control means, and the operation of the incoming message recording means is continued to record the incoming message of the caller. After a time, when the caller stops giving the incoming message to the subscriber, it is judged that the aural signals are not distinguished any more in the aural signal distinguishing means. Therefore, the operation of the incoming message recording means is stopped under the control of the judging and control means.

Thereafter, the telephone number and the recording information stored together in the memory means are displayed in the displaying means.

Therefore, in cases where a large number of telephone calls are given one by one to the telephone terminal equipment at a subscriber's side, the incoming message recording means is automatically operated when the subscriber is absent, and the recording information is stored in the memory means in relation to each of specific telephone numbers of specific callers of which incoming messages are recorded in the recorder of the incoming message recording means.

Accordingly, the subscriber can easily judge whether or not the incoming calls of the specific callers are recorded in the recorder of the incoming message recording means when the subscriber displays the specific telephone numbers of the specific callers in the displaying means.

BRIEF DESCRIPTION OF THE DRAWINGS

The objects, features and advantages of the present invention will be apparent from the following description taken in conjunction with the accompanying drawings, in which.

DETAIL DESCRIPTION OF THE PREFERRED EMBODIMENTS

Preferred embodiments of a telephone terminal equipment according to the present invention are described with reference to drawings.

Figure 1:
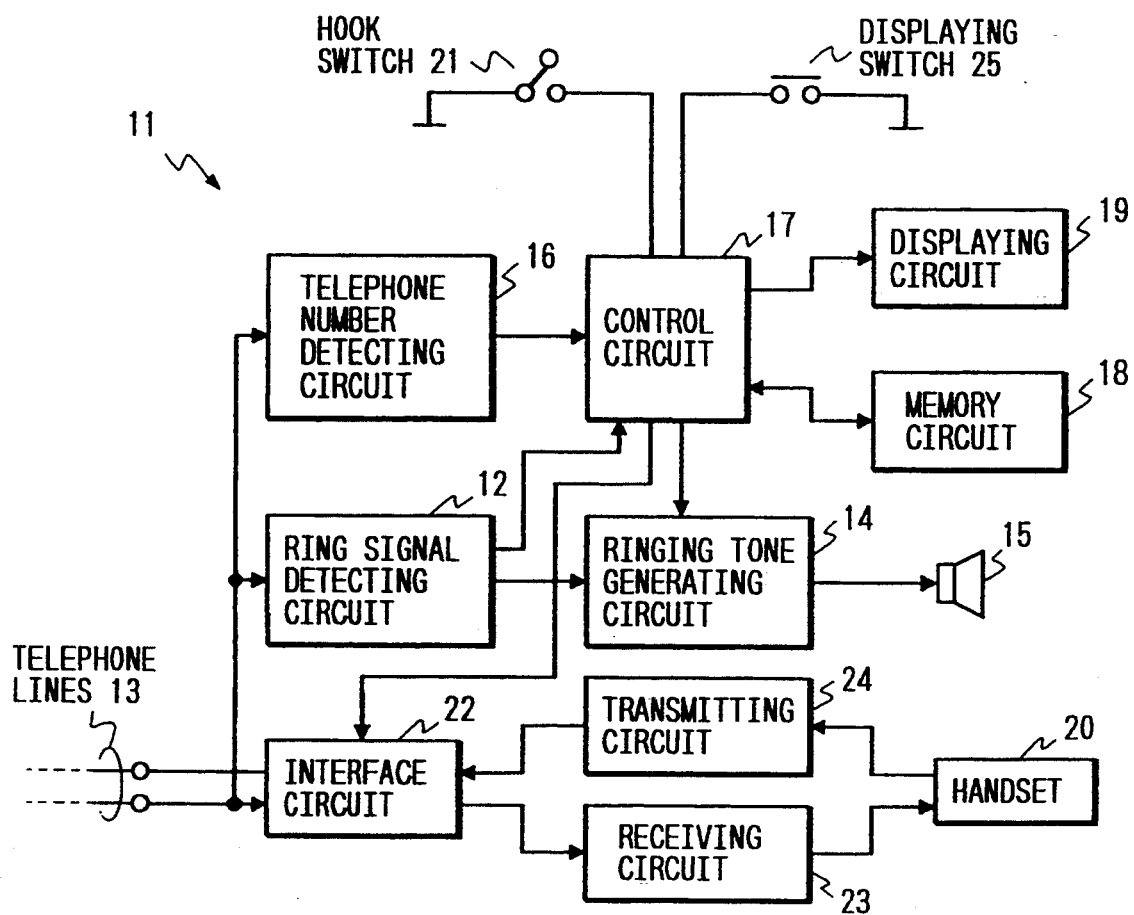
FIG. 1 is a block diagram of a conventional telephone unit.

Constructional elements shown in following drawings which agree with the constructional elements shown in FIG. 1 are denoted by the same reference numerals as those shown in FIG. 1.

Figure 2:
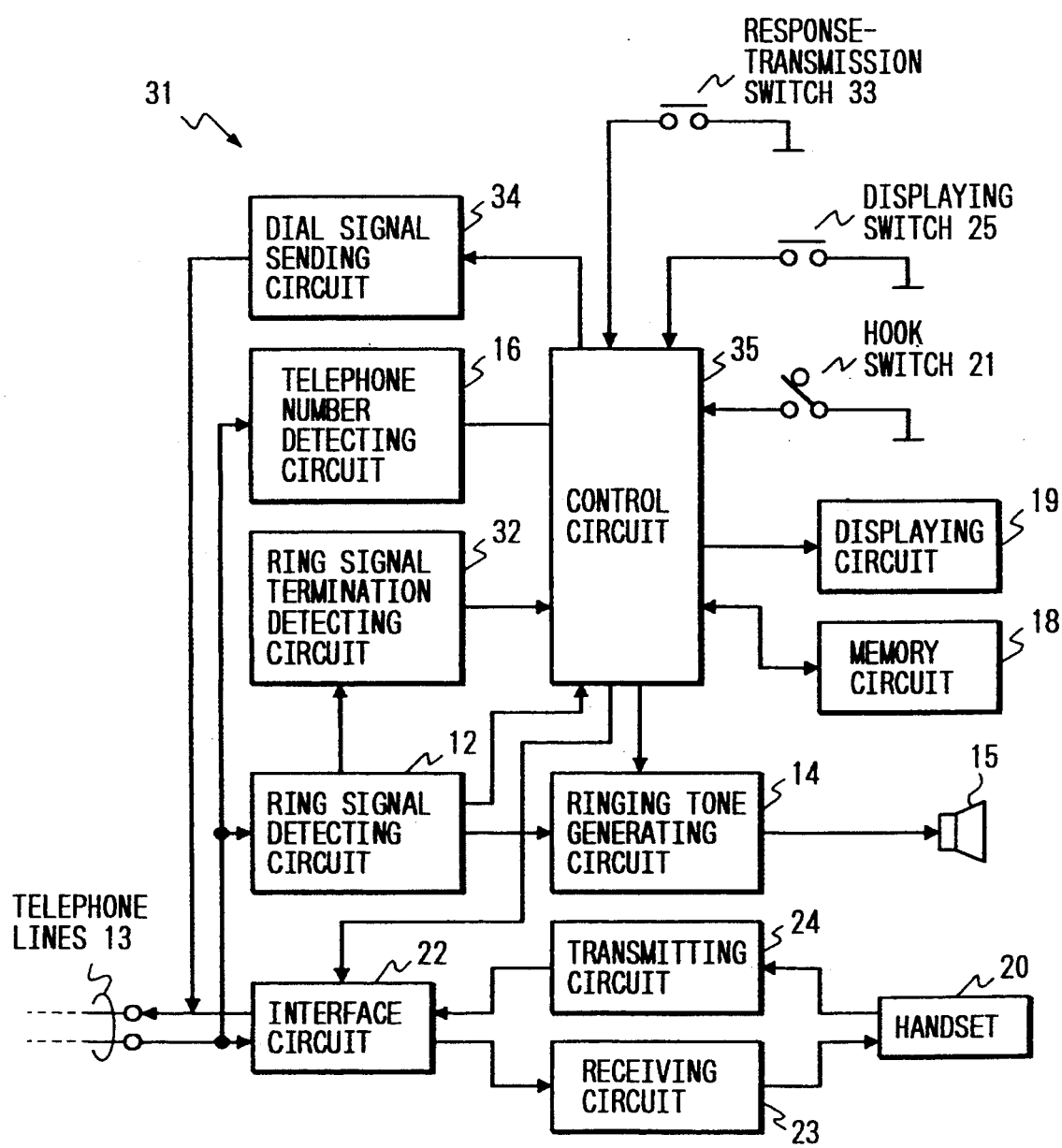
FIG. 2 is a block diagram of a telephone terminal equipment according to a first embodiment of the present invention.
Figure 3:
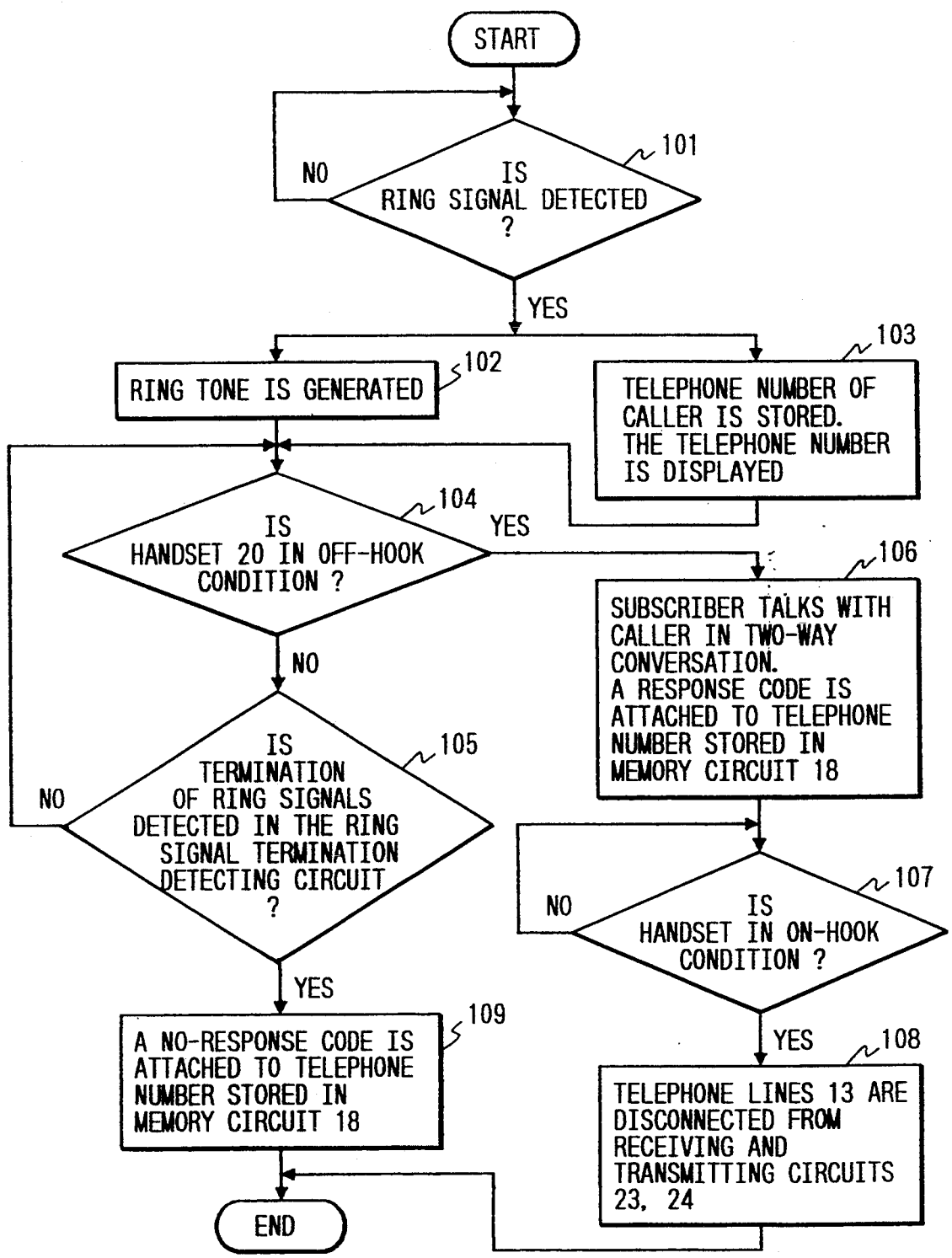
FIG. 3 is a flow chart of a telephone call receiving operation performed in the telephone terminal equipment shown in FIG. 2.

FIG. 2 is a block diagram of a telephone terminal equipment according to a first embodiment of the present invention. FIG. 3 is a flow chart of a telephone call receiving operation performed in the telephone terminal equipment 31 shown in FIG. 2.

As shown in FIG. 2, a telephone terminal equipment 31 at a subscriber's side comprises the ring signal detecting circuit 12, the ringing tone generating circuit 14, the speaker 15, the telephone number detecting circuit 16, the memory circuit 18, the displaying circuit 19, the handset 20, the hook switch 21, the interface circuit 22, the receiving circuit 23, the transmitting circuit 24, the displaying switch 25, a ring signal termination detecting circuit 32 for detecting the termination of a series of ring signals which are detected in the ring signal detecting circuit 12, a response-transmission switch 33 for performing a response-transmission operation in which a telephone call is given to a specific caller relating to a specific telephone number selected from among the telephone numbers stored in the memory circuit 18, a dial signal sending circuit 34 for sending out a dial signal corresponding to the specific telephone number to give the telephone call relating to the response-transmission operation performed in the transmitting switch 33, and a control circuit 35 including a microcomputer for receiving various signals from the ring signal detecting circuit 12, the telephone number detecting circuit 16, the memory circuit 18, the hook switch 21, the displaying switch 25, and the response-transmission switch 33, and controlling the ringing tone generating circuit 14, the memory circuit 18, the displaying circuit 19, the interface circuit 22, and the dial signal sending circuit 34.

In the above configuration, a telephone call receiving operation in which a telephone call given from a caller is received in the telephone terminal equipment 31 is initially described.

The telephone terminal equipment 31 is usually set in a waiting mode in which the handset 20 is attached on the hook switch 21 in the on-hook condition to wait for a telephone call. When a caller gives a telephone call to the subscriber, ring signals are intermittently provided to the telephone terminal equipment 31 at the subscriber's side. Also, a piece of telephone number data subsequent to a first ring signal among the ring signals is provided to the telephone terminal equipment 31.

As shown in FIG. 3, each time one of the ring signals is detected in the ring signal detecting circuit 12 in a step 101, a ringing tone is generated in the ringing tone generating circuit 14 in a step 102. Therefore, the ringing tone is output from the speaker 15. In this case, because the ringing signals are intermittently detected in the ring signal detecting circuit 12, a plurality of ringing tones are intermittently generated in the ringing tone generating circuit 14 until the subscriber takes up the handset 20.

Also, a piece of telephone number data subsequent to the first ring signal is detected in the telephone number detecting circuit 16, and the telephone number data is transferred from the circuit 16 to the control circuit 35 to decode the telephone number data to the telephone number. Thereafter, the telephone number of the caller is stored in the memory circuit 18 in a step 103 with a piece of order information indicating the order of incoming calls. Also, the telephone number is displayed on a liquid crystal display of the displaying circuit 19 under control of the control circuit 35 in the step 103.

Thereafter, it is judged in the control circuit 35 whether or not the handset 20 is attached on the hook switch 21 in the off-hook condition (a step 104). Also, in cases where the subscriber does not lift the handset 20 in the step 104, it is judged in the control circuit 35 whether or not the ring signals are intermittently detected in the ring signal detecting circuit 12 (a step 105).

When the subscriber takes up the handset 20 after one or more ringing tones are output from the speaker 15, the hook switch 21 is switched on, and the handset 20 is changed to the off-hook condition. Therefore, an off-hook signal is transferred from the hook switch 21 to the control circuit 35, and it is judged in the control circuit 35 that the handset 20 is changed to the off-hook condition. As a result, the telephone call receiving operation proceeds from the step 104 to a step 106.

In the step 106, the interface circuit 22 is controlled by the control circuit 35 to connect the telephone lines 13 to the receiving and transmitting circuits 23, 24 through the interface circuit 22. Therefore, the subscriber can talk with the caller in the two-way conversation in the step 106. Also, a response code is attached to the telephone number stored in the memory circuit 18 to specify a piece of response information. Also, it is judged in the control circuit 35 during the conversation whether or not the handset 20 is changed to the on-hook condition (a step 107).

Thereafter, when the conversation between the subscriber and the caller is over, the handset 20 is put back on the hook switch 21 so that the handset 20 is changed to the on-hook condition. Therefore, an on-hook signal is transferred from the hook switch 21 to the control circuit 35, and it is judged in the control circuit 35 that the handset 20 is changed to the on-hook condition. Therefore, the telephone call receiving operation proceeds from the step 107 to a step 108. In the step 108, the interface circuit 22 is controlled by the control circuit 35 to disconnect the telephone lines 13 with the receiving and transmitting circuits 23, 24. As a result, the telephone terminal equipment 31 is again set in the waiting mode.

In contrast, when the caller stops to give the telephone call to the subscriber before the subscriber lifts the handset 20, the arrival of the ring signals to the ring signal detecting circuit 12 is stopped. Therefore, the termination of the ring signals is detected in the ring signal termination detecting circuit 32, and a termination signal is transferred from the ring signal termination detecting circuit 32 to the control circuit 35. As a result, it is judged in the control circuit 35 that the ring signals are not detected any more in the ring signal detecting circuit 12 (the step 105). Therefore, the telephone call receiving operation proceeds from the step 105 to a step 109. The detection of the termination of the ring signals is described in detail with reference to FIG. 4.

Figures 4, 5, 6A, 6B:
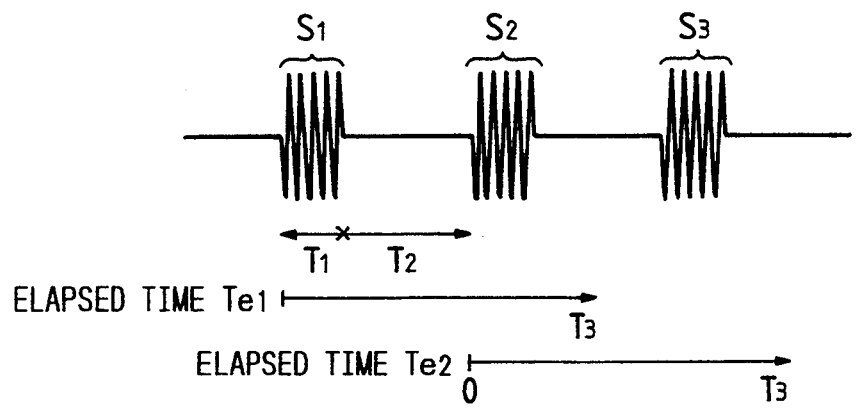
FIG. 4 shows waveform of a series of ring signals transferred from the telephone exchange to the telephone terminal equipment shown in FIG. 2.
FIG. 5 conceptually shows pieces of order information, telephone numbers, pieces of response information stored in a memory circuit shown in FIG. 2.
FIGS. 6A, 6B respectively show telephone numbers displayed on a liquid crystal display of a displaying circuit shown in FIG. 2 in the order of incoming calls according to a telephone number displaying operation.

FIG. 4 shows waveform of a series of ring signals transferred from the telephone exchange to the telephone terminal equipment 31 shown in FIG. 2.

As shown in FIG. 4, the ring signals intermittently arrive at the telephone terminal equipment 31. Each of the ring signals consists of an alternate current signal which has an electric voltage 120 V and continues for a vibrating period $T_1$. Also, the ring signals are spaced to each other a silent period $T_2$. Each of leading edges in the ring signals is detected by the ring signal termination detecting circuit 32. When a ring signal $S_1$ is provided to the ring signal detecting circuit 12, an elapsed time $Te_1$ starting at a leading edge of the ring signal $S_1$ is counted in the ring signal termination detecting circuit 32 until a set-up time $T_3$ sufficiently longer than a cycle interval $T_1 + T_2$ elapses or another leading edge of a ring signal $S_2$ subsequent to the ring signal $S_1$ is detected in the ring signal termination detecting circuit 32. When the leading edge of the ring signal $S_2$ is detected in the ring signal termination detecting circuit 32, the count of the elapsed time $Te_1$ is stopped, and another elapsed time $Te_2$ starting at the leading edge of the ring signal $S_2$ is newly counted in the ring signal termination detecting circuit 32 until the set-up time $T_3$ elapses or another leading edge of a ring signal $S_3$ subsequent to the ring signal $S_2$ is detected in the ring signal termination detecting circuit 32.

Accordingly, because the detection of the ring signals is stopped in cases where the caller stops to give a telephone call to the subscriber, the count of a latest elapsed time is stopped when the set-up time $T_3$ elapses in the ring signal termination detecting circuit 32. At this time, the termination of the ring signals is detected in the ring signal termination detecting circuit 32, and the termination of the ring signals is informed the control section 35.

Therefore, the telephone call receiving operation proceeds to the step 109. In the step 109, a piece of no-response code is attached to the telephone number stored in the memory circuit 18 to specify a piece of response information. Thereafter, the telephone call receiving operation is accomplished in the above steps regardless of whether the subscriber takes up the handset 20.

FIG. 5 conceptually shows pieces of order information, telephone numbers, pieces of response information stored in the memory circuit 18.

As shown in FIG. 5, each time an incoming call is given to the telephone terminal equipment 31, a set of the order information indicating the order of incoming calls, a telephone number relating to an incoming call, and the response information designated by the response code "1" or the no-response code "0" are stored in the memory circuit 18 in the order of incoming calls.

FIGS. 6A, 6B respectively show telephone numbers displayed on the liquid crystal display of the displaying circuit 19 in the order of incoming calls according to a telephone number displaying operation.

As shown in FIGS. 6A, 6B, when the subscriber pushes down the displaying switch 25, telephone numbers Nt ($Nt_1$, $Nt_2$, - - -) and no-response codes "0" of the response information are read out from the memory circuit 18, and the telephone numbers Nt and no-response marks Mn relating to the no-response codes "0" are displayed on the liquid crystal display of the displaying circuit 19 in the order of incoming calls under the control of the control circuit 35. For example, in cases where the subscriber does not respond to the caller having the telephone number $Nt_2$, one of the no-response marks Mn is displayed at the head of the telephone number $Nt_2$.

Accordingly, even though the subscriber does not respond to a telephone call given by a specific caller, the subscriber can identify a specific telephone number relating to the specific caller because the specific telephone number can be displayed with the no-response mark Mn attached to the specific telephone number on the liquid crystal display of the displaying circuit 19 when the subscriber pushes down the displaying switch 25.

In addition, one of the telephone numbers Nt is designated by a designation underline Ld. Also, the designation underline Ld can be moved to any telephone number according to a scroll operation performed by the subscriber. For example, as shown in FIGS. 6A, 6B, the telephone number $Nt_1$ designated by the designation underline Ld can be changed to the telephone number $Nt_2$.

Also, in cases where the subscriber pushes down the response-transmission switch 33 on condition that the telephone number $Nt_2$ is, for example, designated by the designation underline Ld shown in FIG. 6B, a response-transmission operation can be performed in the telephone terminal equipment 31. That is, the telephone number $Nt_2$ designated by the designation underline Ld is read out from the memory circuit 18 to the control circuit 35. Thereafter, a dial signal relating to the telephone number $Nt_2$ is sent out from the dial signal sending circuit 34 to a caller relating to the telephone number $Nt_2$ under the control of the control circuit 35 to give a telephone call to the caller in response to the caller's telephone call. The response-transmission operation is described ill detail with reference to FIG. 7.

Figure 7:
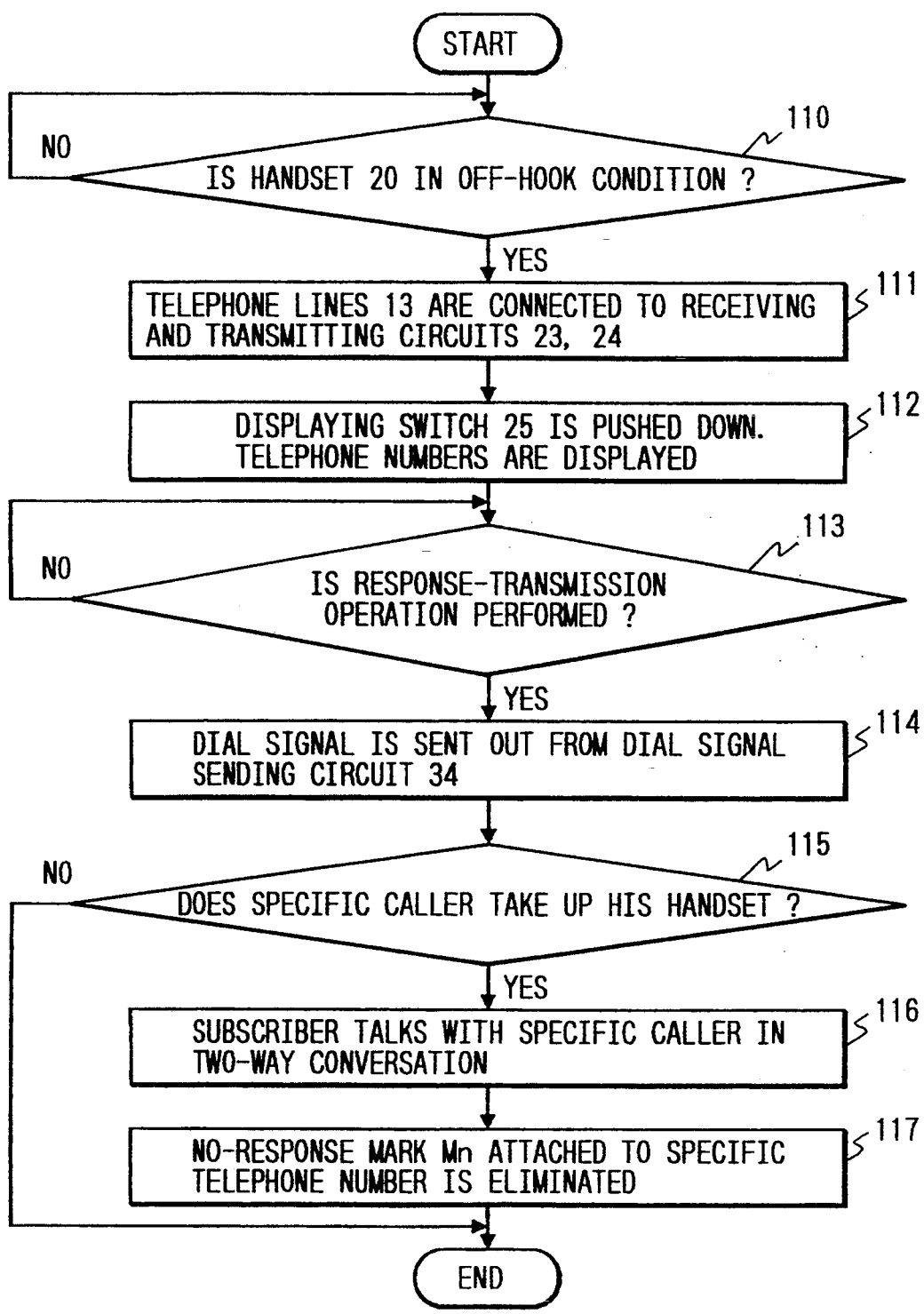
FIG. 7 is a flow chart of a response-transmission operation performed in the telephone terminal equipment shown in FIG. 2.

FIG. 7 is a flow chart of the response-transmission operation performed in the telephone terminal equipment 31 shown in FIG. 2.

As shown in FIG. 7, when the subscriber takes up the handset 20, the hook switch 21 is switched on so that the handset 20 is set to the off-hook condition. Thereafter, an off-hook signal is transferred from the hook switch 21 to the control circuit 35. Therefore, it is judged in the control circuit 35 that the handset 20 is set in the off-hook condition (a step 110). Thereafter, the interface circuit 22 is controlled by the control circuit 35 to connect the telephone lines 13 to the receiving and transmitting circuits 23, 24 through the interface circuit 22 (a step 111).

Thereafter, in cases where the subscriber intends to give a telephone call to a caller according to a normal transmission operation, the subscriber necessarily dials a telephone number of the receiver by pushing keypads (not shown) on the handset 20 so that a dial signal relating to the telephone number is sent out from the dial signal sending circuit 34 to the caller under the control of the control circuit 35.

In contrast, in cases where the subscriber intends to give a telephone call to a specific caller in response to the specific caller's telephone call according to the response-transmission operation, the subscriber pushes down the displaying switch 25 in a step 112. Therefore, all of the telephone numbers stored in the memory circuit 18 are displayed on the displaying circuit 19. Thereafter, the subscriber identifies a specific telephone number of the specific caller to which a no-response mark Mn is attached, and the subscriber designates the specific telephone number by setting the designation underline Ld to the specific telephone number according to the scroll operation. Thereafter, the subscriber pushes down the response-transmission switch 33 to transfer a response signal and the specific telephone number to the control circuit 35. Therefore, it is judged in the control circuit 35 that the response-transmission operation is performed in the telephone terminal equipment 31 (a step 113). Thereafter, a dial signal relating to the specific telephone number is sent out from the dial signal sending circuit 34 to the specific caller under the control of the control circuit 35 in a step 114. Thereafter, it is judged in the control circuit 35 whether or not the specific caller takes up his handset (a step 115).

In cases where the specific caller takes up his handset after a time, the operation proceeds to a step 116 and the subscriber talks with the specific caller in the two-way conversation. Thereafter, when the handset 20 is put back on the hook switch 21 because the conversation is over, an on-hook signal is transferred from the hook switch 21 to the control circuit 35. Therefore, the no-response mark Mn attached to the specific telephone number in the memory circuit 18 is eliminated in a step 117.

In contrast, in cases where the specific caller does not take up his handset even though the subscriber waits for a long time, the handset 20 is put back on the hook switch 21 without taking with the specific caller. In this case, the response-transmission operation is finished without eliminating the no-response mark Mn attached to the specific telephone number.

Accordingly, even though the subscriber does not respond to a first telephone call given by the specific caller, the subscriber can reliably give a second telephone call to the specific caller in response to the first telephone call of the specific caller according to the response-transmission operation because the no-response mark Mn is attached to the specific telephone number displayed on the liquid crystal display of the displaying circuit 19.

Also, the subscriber can easily send a dial signal to the specific caller under time control of the control circuit 35 without dialing the specific telephone number because the specific telephone number is automatically read out from the memory circuit to the control circuit 35.

In the first embodiment, the no-response marks Mn are attached to the telephone numbers relating to the no-response calls to distinguish no-response calls from response calls. However, the distinction of those calls is not limited to the use of the no-response marks Mn. That is, it is preferred that response marks Mr be attached to telephone numbers relating to the response calls.

Also, the display circuit 19 is provided with the liquid crystal display in the first embodiment. However, it is preferred that the display circuit 19 be provided with a printer in which the telephone numbers and the no-response marks Mn are printed out. Also, it is preferred that the display circuit 19 be provided with a composite voice producer in which a composite voice such as a voice "no response" is sounded after a telephone number is sounded.

Next, a second embodiment of the present invention is described.

Figure 8:
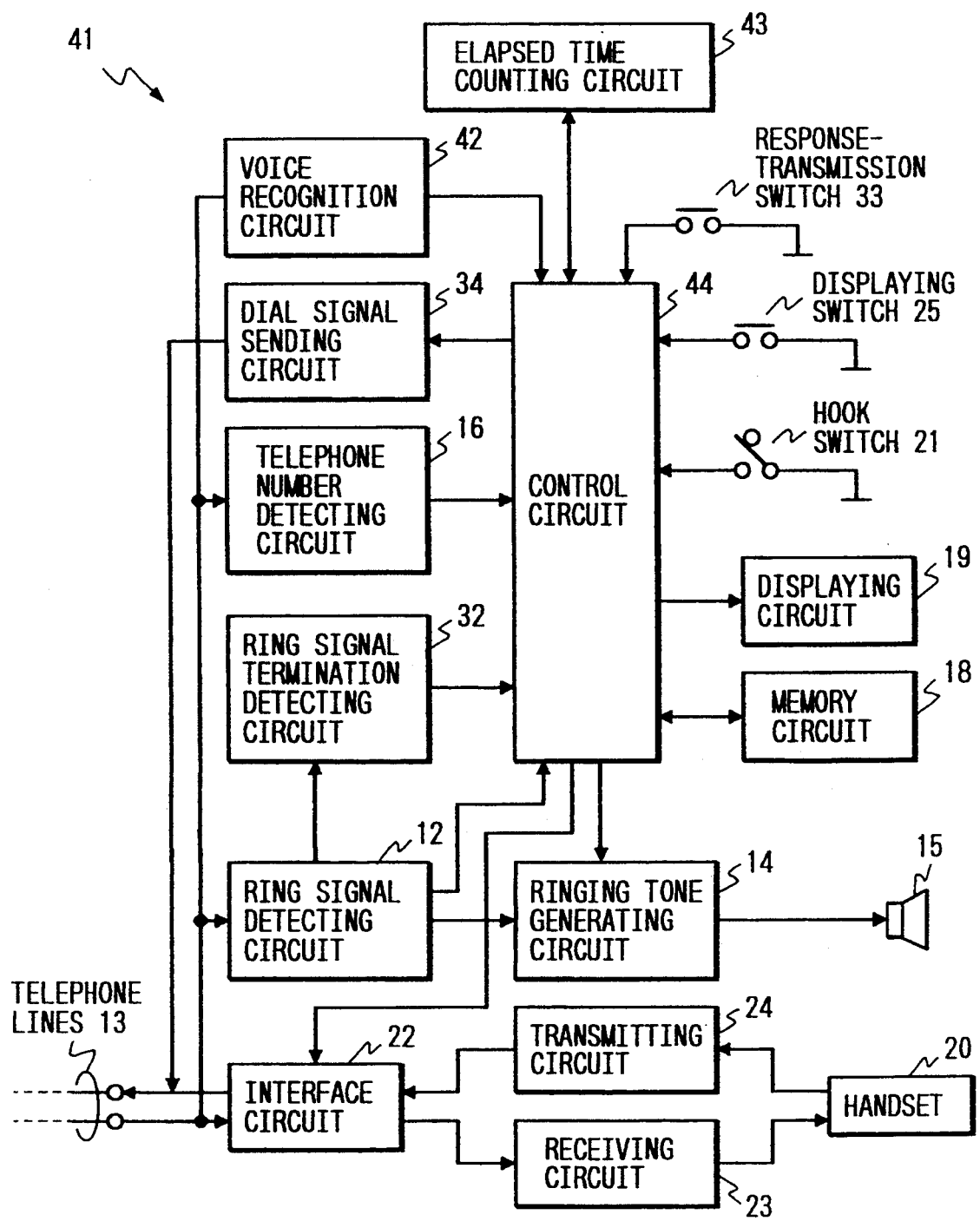
FIG. 8 is a block diagram of a telephone terminal equipment according to a second embodiment of the present invention.

FIG. 8 is a block diagram of a telephone terminal equipment according to a second embodiment of the present invention.

As shown in FIG. 8, a telephone terminal equipment 41 at a subscriber's side comprises the ring signal detecting circuit 12, time ringing tone generating circuit 14, the speaker 15, the telephone number detecting circuit 16, the memory circuit 18, the displaying circuit 19, the handset 20, the hook switch 21, the interface circuit 22, the receiving circuit 23, the transmitting circuit 24, the displaying switch 25, the ring signal termination detecting circuit 32, the response-transmission switch 33, the dial signal sending circuit 34, a voice recognition circuit 42 for recognizing a voice of a caller transferred through the telephone lines 13, an elapsed time counting circuit 43 for counting an elapsed time of the conversation performed between the caller and the subscriber after the voice of the caller is recognized in the voice recognition circuit 42, and a control circuit 44 including a microcomputer for receiving various signals from the ring signal detecting circuit 12, the telephone number detecting circuit 16, the memory circuit 18, the hook switch 21, the displaying switch 25, the response-transmission switch 33, the voice recognition circuit 42, and the elapsed time counting circuit 43, and controlling the ringing tone generating circuit 14, the memory circuit 18, the displaying circuit 19, the interface circuit 22, the dial signal sending circuit 34, and the elapsed time counting circuit 43.

In the above configuration, a response-transmission operation is performed in the same manner as in the telephone terminal equipment 31 so that only a telephone call receiving operation according to the second embodiment of the present invention is described.

Figure 9:
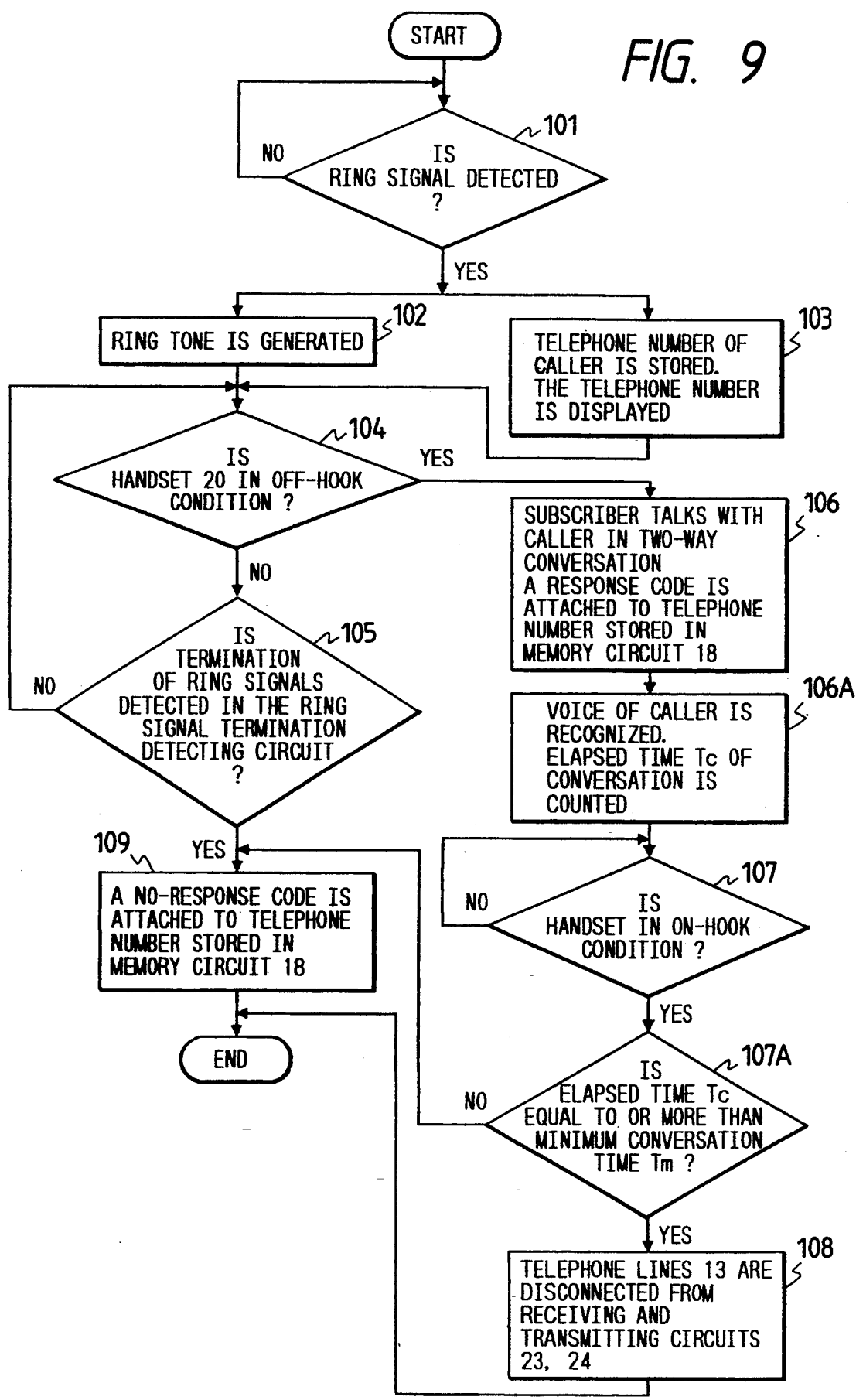
FIG. 9 is a flow chart of a telephone call receiving operation performed in the telephone terminal equipment shown in FIG. 8 according to the second embodiment of the present invention.

FIG. 9 is a flow chart of a telephone call receiving operation performed in the telephone terminal equipment 41 shown in FIG. 8 according to the second embodiment of the present invention.

As shown in FIG. 9, the telephone call receiving operation is initially performed according to the steps 101 to 106 in the same manner as in the telephone terminal equipment 31. Thereafter, when the subscriber starts on talking with the caller in the two-way conversation in the step 106, a voice of the caller is recognized in the voice recognition circuit 42 in a additional step 106A. Also, when the voice of the caller is recognized in the voice recognition circuit 42, a voice recognition signal is transferred to the control circuit 44, and an elapsed time Tc of the two-way conversation is counted in an elapsed time counting circuit 43 under the control of the control circuit 44 in the step 106A. Thereafter, the step 107 is performed in the same manner as in the telephone terminal equipment 31.

When the handset 20 is put back on the hook switch 21 because the conversation is over, the operation proceeds to an additional step 107A, and it is judged in the control circuit 44 whether or not the elapsed time Tc counted in the elapsed time counting circuit 43 is equal to or more than a minimum conversation time Tm. In cases where the elapsed time Tc is lower than the minimum conversation time Tm, it is judged in the control circuit 44 that the response of the subscriber to the telephone call of the caller is not successful. Therefore, the operation proceeds to the step 109 so that a no-response mark Mn is attached to the telephone number of the caller stored in the memory circuit 18 under the control of the control circuit 44. In contrast, in cases where the elapsed time Tc is equal to or more than the minimum conversation time Tm, it is judged in the control circuit 44 that the response of the subscriber to the telephone call of the caller is successful. Therefore, the operation proceeds to the step 108, and the step 108 is performed in the same manner as in the telephone terminal equipment 31.

Therefore, even though the handset 20 is put back on the hook switch 21 in the step 107, the conversation between the subscriber and the caller is not necessarily performed meaningfully. For example, there is a case that the caller promptly puts back his handset without taking with the subscriber after the subscriber takes up the handset 20 in the step 104. In this case, the handset 20 is put back on the hook switch 21. In the step 107 without taking with the caller. Also, even though the subscriber starts on taking with the caller in the step 106, there is another case that the conversation is erroneously interrupted. In this case, the handset 20 is put back on the hook switch 21 in the step 107 without meaningfully performing the conversation.

Accordingly, because the elapsed time Tc of the conversation performed between the caller and the subscriber is counted in cooperation with the voice recognition circuit 42 and the elapsed time counting circuit 43, it can be judged in the control circuit 44 whether or not the conversation between the subscriber and the caller is meaningfully performed.

In the second embodiment, a voice of the caller is recognized in the voice recognition circuit 42. However, the second embodiment is not limited to the voice of the caller. That is, it is preferred that a voice of the subscriber be recognized in the voice recognition circuit 42 in place of the voice of the caller.

Next, a third embodiment of the present invention is described with reference to drawings.

Figure 10:
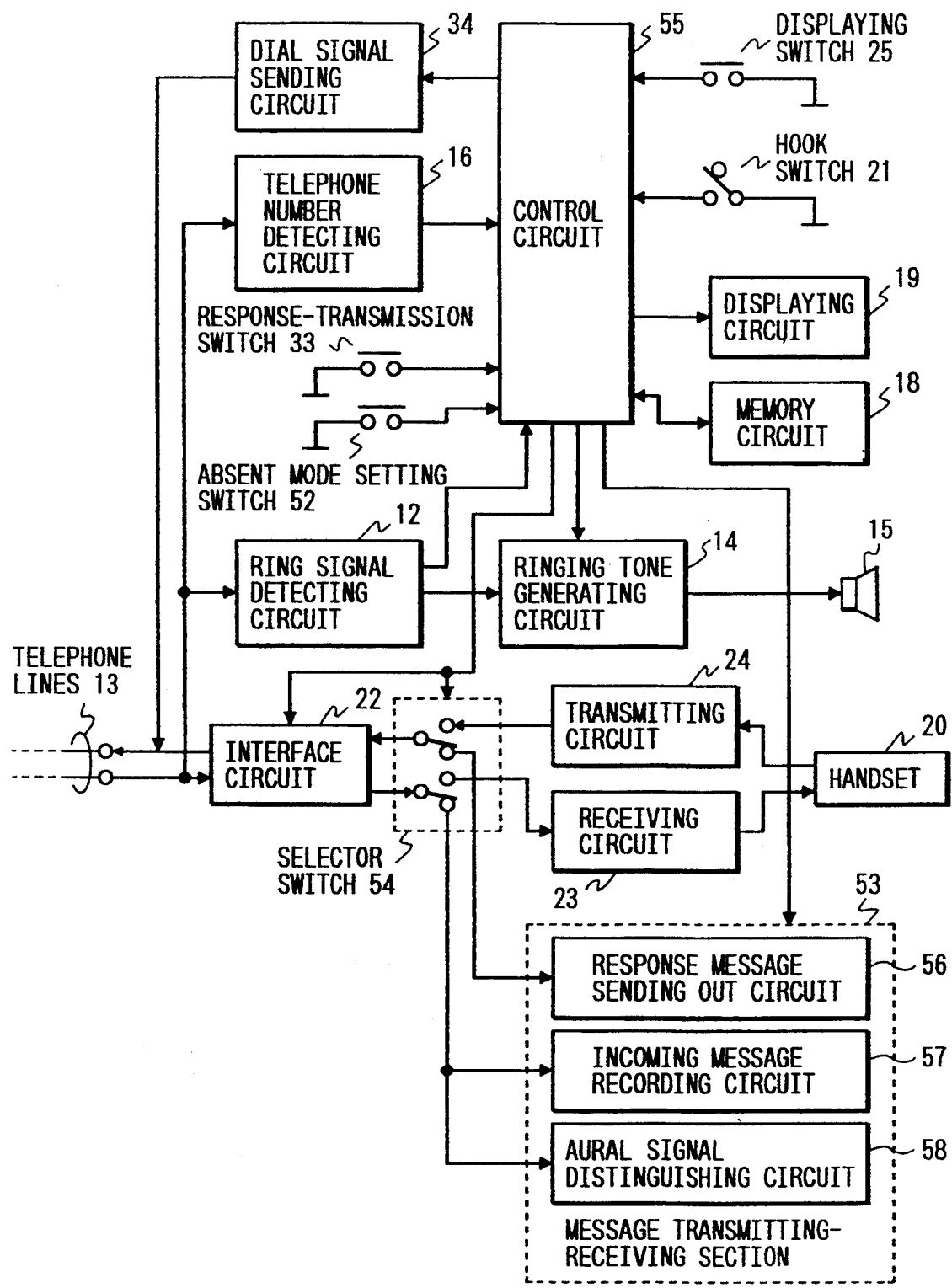
FIG. 10 is a block diagram of a telephone terminal equipment according to a third embodiment of the present invention.

FIG. 10 is a block diagram of a telephone terminal equipment according to a third embodiment of the present invention.

As shown in FIG. 10, a telephone terminal equipment 51 at a subscriber's side comprises the ring signal detecting circuit 12, the ringing tone generating circuit 14, the speaker 15, the telephone number detecting circuit 16, the memory circuit 18, the displaying circuit 19, the handset 20, the hook switch 21, the interface circuit 22, the receiving circuit 23, the transmitting circuit 24, the displaying switch 25, the response-transmission switch 33, the dial signal sending circuit 34, an absent mode setting switch 52 for switching the telephone terminal equipment 51 from the waiting mode to an absent mode, a message transmitting-receiving section 53 for automatically transmitting a response message of the subscriber and receiving an incoming message of the caller in cases where the telephone terminal equipment 51 is set in the absent mode, a selector switch 54 for connecting the telephone lines 13 to the handset 20 in the waiting mode and connecting the telephone lines 13 to the message transmitting-receiving section 53 in the absent mode, a control circuit 55 including a microcomputer for receiving various signals from the ring signal detecting circuit 12, the telephone number detecting circuit 16, the memory circuit 18, the hook switch 21, the displaying switch 25, the response-transmission switch 33, and the absent mode setting switch 52, and controlling the ringing tone generating circuit 14, the memory circuit 18, the displaying circuit 19, the interface circuit 22, the dial signal sending circuit 34, the message transmitting-receiving section 53, and the selector switch 54.

The message transmitting-receiving section 53 comprises a response message sending out circuit 56 for sending out the response message of the subscriber recorded in advance in a recording tape, an incoming message recording circuit 57 for recording the incoming message of the caller which is transferred in the form of aural signals, and an aural signal distinguishing circuit 58 for distinguishing the aural signals from various signals transferred through the telephone lines 13 to detect the end of the incoming message.

In the above configuration, a telephone call receiving operation in the waiting mode is performed in the same manner as in the first embodiment. Therefore, a telephone call receiving operation in the absent mode is initially described in detail.

Figure 11:
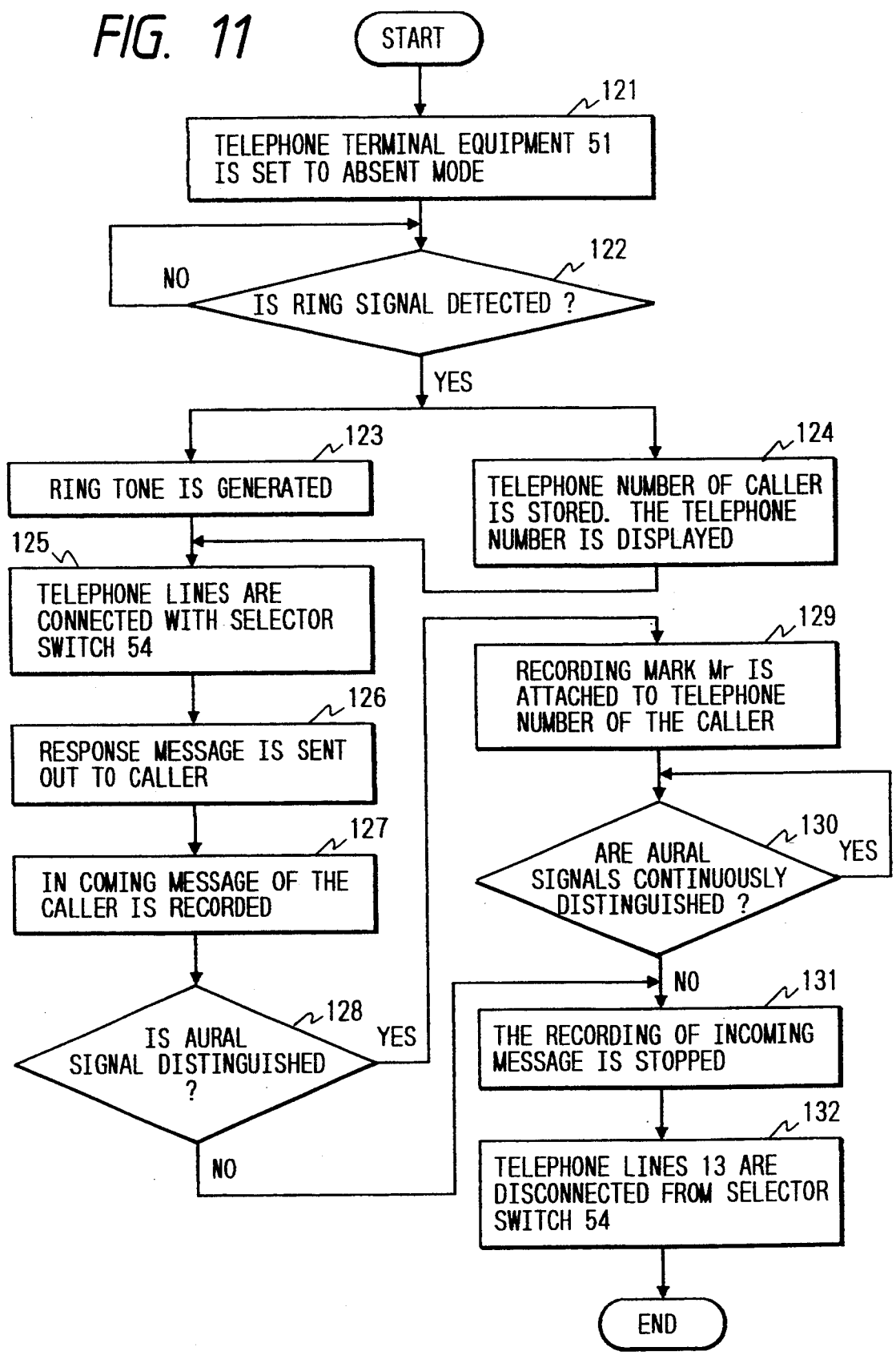
FIG. 11 is a flow chart of a telephone call receiving operation in an absent mode performed in the telephone terminal equipment shown in FIG. 10 according to the third embodiment of the present invention.

FIG. 11 is a flow chart of a telephone call receiving operation in the absent mode performed in the telephone terminal equipment 51 shown in FIG. 10 according to the third embodiment of the present invention.

As shown in FIG. 11, when the subscriber leaves his house, the subscriber switches on the absent mode setting switch 52 to set the telephone terminal equipment 51 in the absent mode (a step 121). Therefore, a mode switching signal is transferred from the absent mode setting switch 52 to the control circuit 55, and the selector switch 54 is switched under the control of the control circuit 55 to connect the telephone lines 13 to the message transmitting-receiving section 53 Through the interface circuit 22.

Thereafter, when a caller gives a telephone call to the subscriber, ring signals are intermittently provided to the telephone terminal equipment 51, and a piece of telephone number data subsequent to a first ring signal among the ring signals is provided to the telephone terminal equipment 51. Therefore, each time one of the ring signals is detected in the ring signal detecting circuit 12 in a step 122, a ringing tone is generated in the ringing tone generating circuit 14 in a step 123. Therefore, the ringing tones are intermittently output from the speaker 15.

Also, when a piece of telephone number data subsequent to the first ring signal is detected in the telephone number detecting circuit 16, the telephone number data is transferred from the circuit 16 to the control circuit 55 to decode the telephone number data to the telephone number. Thereafter, the telephone number of the caller is stored in the memory circuit 18 in a step 124 with a piece of order information indicating the order of incoming calls. Also, the telephone number is displayed on the liquid crystal display of the displaying circuit 19 under control of the control circuit 55 in the step 124.

Thereafter, because the subscriber is absent, the ringing tones continue to be output from the speaker 15. When the number of ring signals provided to the ring signal detecting circuit 12 reaches a predetermined number, the interface circuit 22 is controlled by the control circuit 55 to connect the telephone lines 13 with the selector switch 54 (a step 125). Therefore, the message transmitting-receiving section 53 is connected with the telephone lines 13 through the interface circuit 22 and the selector switch 54. Thereafter, a response message recorded in the response message sending out circuit 56 is automatically sent out to the caller under the control of the control circuit 55 in a step 126.

After all of the response message is sent out from the response message sending out circuit 56, the incoming message recording circuit 57 is automatically operated to record an incoming message of the caller under the control of the control circuit 55 in a step 127. The structure of the response message sending out circuit 56 and the incoming message recording circuit 57 is the same as that utilized in a conventional telephone terminal equipment. Therefore, a detail description of the circuits 56, 57 is omitted.

During the recording in the incoming message recording circuit 57, many types of signals such as an aural signal, a busy tone signal, and a silent tone signal are transferred to the incoming message recording circuit 57. Because the incoming message of the caller is transferred in the form of aural signals, the aural signals are distinguished from the busy tone signals and the silent tone signals in the aural signal distinguishing circuit 58. For example, in cases where the strength or phase of signals transferred through the telephone lines 13 is irregularly changed, the signals are judged as aural signals in the aural signal distinguishing circuit 58. In contrast, in cases where the strength or phase of signals transferred through the telephone lines 13 is regularly changed, the signals are judged as busy tone signals in the aural signal distinguishing circuit 58. Also, in cases where the strength or phase of signals transferred through the telephone lines 13 is not changed, the signals are judged as silent tone signals in the aural signal distinguishing circuit 58. Therefore, it is judged in the control circuit 55 whether or not an aural signal is distinguished in the aural signal distinguishing circuit 58 (a step 128).

In cases where an aural signal is distinguished in the aural signal distinguishing circuit 58 after the incoming message recording circuit 57 is operated, the incoming message of the caller is reliably recorded in the incoming message recording circuit 57. Thereafter, a distinguishing signal is transferred from the aural signal distinguishing circuit 58 to the control circuit 55, and a recording mark Mr is attached to the telephone number of the caller stored in the memory circuit 18 under the control of the control circuit 55 in a step 129. The recording mark Mr indicates that the incoming message of the caller is recorded in the incoming message recording circuit 57.

Thereafter, the operation in the aural signal distinguishing circuit 58 is continued, and it is judged in the control circuit 55 whether or not the aural signals are continuously distinguished in the aural signal distinguishing circuit 58 (a step 130). When the caller finishes giving the incoming message of the caller to the subscriber, the caller puts down his handset. Therefore, any aural signal is not detected in the aural signal distinguishing circuit 58. In this case, a message finishing signal is transferred from the aural signal distinguishing circuit 58 to the control circuit 55, and the recording of the incoming message in the recording circuit 57 is stopped under the control of the control circuit 55 in a step 131. Also, the interface circuit 22 is controlled by the control circuit 55 to disconnect the telephone lines 13 with the selector switch 54 (a step 132).

In contrast, in cases where the caller puts down his handset without giving the incoming message of the caller to the subscriber after the incoming message recording circuit 57 is operated, any aural signal is not detected in the aural signal distinguishing circuit 58 in the step 128. Therefore, the operation proceeds to the step 131 without attaching any recording mark Mr to the telephone number of the caller stored in the memory circuit 18. Thereafter, the recording in the incoming message recording circuit 57 is stopped in the step 131, and the telephone lines 13 is disconnected with the selector switch 54 in the step 132.

Accordingly, in cases where the incoming message of the caller is recorded in the incoming message recording circuit 57 in the absent mode, the recording mark Mr can be reliably attached to the telephone number of the caller stored in the memory circuit 18. In contrast, in cases where the caller does not give the incoming message of the caller to the subscriber in the absent mode, any recording mark Mr is not attached to the telephone number of the caller stored in the memory circuit 18.

Next, a displaying operation in which telephone numbers stored in the memory circuit 18 are displayed is described according to the third embodiment.

When the subscriber returns home, the subscriber switches off the absent mode setting switch 52 to set the telephone terminal equipment 51 in the waiting mode. Therefore, a mode switching signal is transferred from the absent mode setting switch 52 to the control circuit 55, and the selector switch 54 is switched under the control of the control circuit 55 to connect the telephone lines 13 to the handset 20 through the interface circuit 22.

Figure 12:
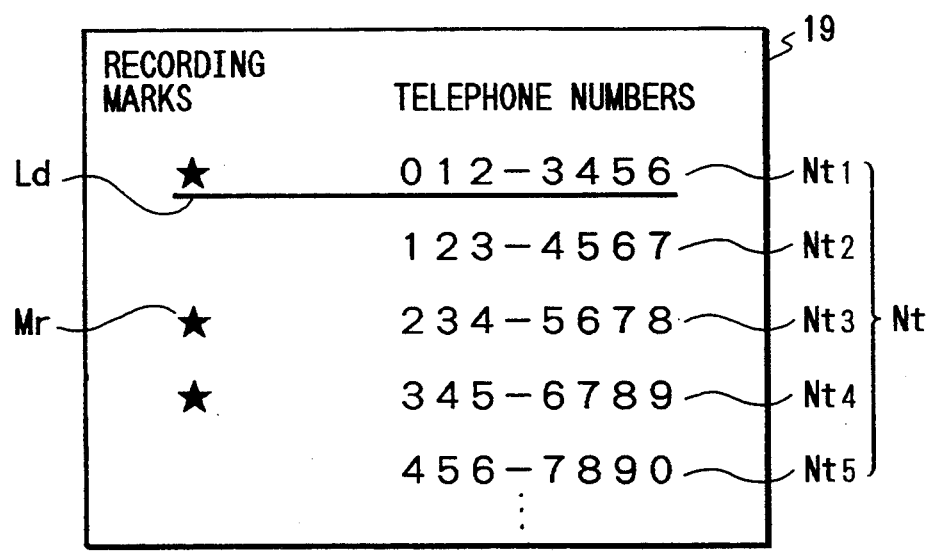
FIG. 12 shows telephone numbers displayed on a liquid crystal display of a displaying circuit shown in FIG. 10 in the order of incoming calls according to a telephone number displaying operation.

Thereafter, when the subscriber pushes down the displaying switch 25, telephone numbers Nt stored in the memory circuit 18 are displayed on the liquid crystal display of the display circuit 19 as shown in FIG. 12. Also, recording marks Mr relating to the telephone numbers are displayed. Accordingly, in cases where the incoming message of the caller is recorded in the incoming message recording circuit 57 in the absent mode, the subscriber can visually find out a group of telephone numbers of which the callers respectively give an incoming message recorded in the incoming message recording circuit 57.

Next, a response-transmission operation is described according to the third embodiment.

As shown in FIG. 12, one of the telephone numbers Nt is designated by a designation underline Ld. The designation underline Ld can be moved to any telephone number according to a scroll operation performed by the subscriber. Therefore, in cases where the subscriber intends to give a telephone call to a caller relating to a telephone number $Nt_1$ to which a recording mark Mr is attached, the designation underline Ld is set to the telephone number $Nt_1$. Thereafter, when the subscriber pushes the response-transmission switch 33, the telephone number $Nt_1$ designated by the designation underline Ld is read out from the memory circuit 18 to the control circuit 55. Thereafter, a dial signal relating to the telephone number $Nt_1$ is sent out from the dial signal sending circuit 34 to the caller relating to the telephone number $Nt_1$ under the control of the control circuit 55 to give a telephone call to the caller. Also, in cases where the subscriber takes up the handset 20, the interface circuit 22 is controlled by the control circuit 55 to connect the telephone lines 13 with the handset 20.

Accordingly, in cases where the subscriber intends to give a telephone call to a caller relating to an incoming message recorded in the incoming message recording circuit 57, the subscriber can accurately give a telephone call to the caller without dialing.

Also, in cases where the two-way conversation between the subscriber and the caller is performed in the same manner as in the step 105 shown in FIG. 3, the recording mark Mr attached to the telephone number $Nt_1$ is removed after an on-hook signal is transferred from the hook switch 21 to the control circuit 55.

Accordingly, it is not necessary to manually remove the recording mark Mr after the telephone conversation is performed.

In the third embodiment, the recorded marks Mr are attached to telephone numbers relating to recorded telephone calls. However, it is not limited to attach the recorded marks Mr. That is, it is preferred that no-recorded marks be attached to telephone numbers relating to no recorded telephone calls.

Also, the display circuit 19 is provided with the liquid crystal display in the third embodiment. However, it is preferred that the display circuit 19 be provided with a printer in which the telephone numbers and the recorded marks Mr are printed out together. Also, it is preferred that the display circuit 19 be provided with a composite voice producer in which a composite voice such as a voice "recorded" is sounded after a telephone number is sounded.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A telephone terminal equipment comprising:
   ring signal detecting means for detecting ring signals related to a telephone call of a caller to a subscriber;
   telephone number detecting means for detecting a telephone number of the caller transferred with the ring signals detected by the ring signal detecting means;
   memory means for storing the telephone number detected by the telephone number detecting means;
   control means for controlling the memory means to store no-response information in relation to the telephone number in the memory means, the no-response information indicating that the subscriber makes no response to the telephone call of the caller;
   displaying means for displaying both the telephone number and the no-response information relating to the telephone number stored in the memory means; and
   ring signal termination detecting means for detecting termination of the ring signals detected by the ring signal detecting means, the no-response information being stored in the memory means under the control of the control means in cases where the termination of the ring signals is detected in the ring signal termination detecting means;
   wherein the termination of the ring signals is detected in the ring signal termination detecting means when a predetermined set-up time passes without the detection of any ring signals by the ring signal termination detecting means.

2. A telephone terminal equipment, comprising:
   ring signal detecting means for detecting a plurality of ring signals relating to a telephone call of a caller to a subscriber one by one;
   telephone number detecting means for detecting a telephone number of the caller transferred with the ring signals detected in the ring signal detecting means;
   memory means for storing the telephone number detected in the telephone number detecting means;
   voice recognizing means for recognizing a voice given in a telephone conversation between the subscriber and the caller;
   elapsed time counting means for counting an elapsed time of the telephone conversation recognized in the voice recognizing means;
   judging and controlling means for judging whether or not the elapsed time counted in the elapsed time counting means reaches a minimum conversation time and controlling the memory means to store a piece of no-response information in relation to the telephone number in the memory means in cases where the elapsed time counted in the elapsed time counting means does not reach the minimum conversation time; and
   displaying means for displaying the telephone number stored in the memory means and the no-response information stored in the memory means under control of the judging and control means.

3. An equipment according to claim 2 in which a voice of the caller is recognized in the voice recognizing means.

4. An equipment according to claim 2 in which a voice of the subscriber is recognized in the voice recognizing means.

5. An equipment according to claim 2 additionally including:
   instructing means for instructing the memory means to transfer the telephone number stored in the memory means to the judging and control means; and
   dial signal sending means for sending out a dial signal corresponding to the telephone number transferred from the memory means under instructions from the instructing means.

6. An equipment according to claim 5 in which the no-response information stored in the memory means is removed under the control of the judging and control means after the dial signal is sent out from the dial signal sending means to the caller.

7. An equipment according to claim 2 in which the displaying means has a liquid crystal display on which the telephone number and the no-response information are displayed.

8. An equipment according to claim 2 in which the displaying means has a printer in which the telephone number and the no-response information are printed out.

9. An equipment according to claim 2 in which the displaying means has a composite voice producer in which a composite voice such as a voice "no response" is sounded after the telephone number is sounded.

10. A telephone terminal equipment, comprising:
    spring signal detecting means for detecting ring signals relating to a telephone call of a caller to a subscriber;
    telephone number detecting means for detecting a telephone number of the caller transferred with the rink signals detected by the ring signal detecting means;
    memory means for storing the telephone number detected by the telephone number detecting means;
    ring signal termination detecting means for detecting termination of the rink signals detected in the ring signal detecting means in cases where the caller stops giving the telephone call to the subscriber before the subscriber makes a response to the telephone call of the caller;
    voice recognizing means for recognizing a voice given in a telephone conversation between the subscriber and the caller in cases where the subscriber makes a response to the telephone call of the caller before the caller stops giving the telephone call to the subscriber;
    elapsed time counting means for counting an elapsed time of the telephone conversation recognized in the voice recognizing means;
    judging means for judging whether or not the elapsed time counted in the elapsed time counting means reaches a minimum conversation time;
    control means for controlling the memory means to store no-response information in relation to the telephone number in the memory means in cases where the termination of the ring signals detected in the ring signal detecting means is detected in the ring signal termination detecting means or in cases where the elapsed time counted in the elapsed time counting means does not reach the minimum conversation time, the no-response information indicating that the subscriber makes no response to the telephone call of the caller or that the telephone conversation is unsuccessfully over; and displaying means for displaying the telephone number stored in the memory means and the no-response information stored in the memory means.

11. A telephone terminal equipment comprising:

ring signal detecting means for detecting ring signals relating to a telephone call of a caller to a subscriber;

telephone number detecting means for detecting a telephone number of the caller transferred with the ring signals detected by the ring signal detecting means;

memory means for storing the telephone number detected by the telephone number detecting means;

response message sending means for sending out a response message of the subscriber to the caller in cases where the ring signals are detected by the ring signal detecting means, the response message being recorded in a recorder in advance;

incoming message recording means for recording an incoming message of the caller after the response message of the subscriber is sent out from the response message sending means, the incoming message of the caller being transferred through telephone lines in a form of aural signals;

aural signals distinguishing means for distinguishing the aural signals forming the incoming message of the caller recorded in the incoming message recording means from various types of signals transferred through the telephone line;

judging and control means for judging whether or not the aural signals are distinguished in the aural signal distinguishing means, controlling the memory means to store a piece of recording information in relation to the telephone number stored in the memory means in cases where it is judged that the aural signals are distinguished in the aural signal distinguishing means, and controlling the incoming message recording means to stop recording the incoming message of the caller in cases where the judging and control means judges that the aural signals are no longer distinguished in the aural signal distinguishing means; and displaying means for displaying both the telephone number stored in the memory means and the recording information relating to the telephone number in the memory means.

12. An equipment according to claim 11, additionally including:

instructing means for instructing the memory means to transfer the telephone number stored in the memory means to the judging and control means; and dial signal sending means for sending out a dial signal corresponding to the telephone number transferred from the memory means under instructions from the instructing means.

13. An equipment according to claim 12 in which the recording information stored in the memory means is removed under the control of the judging and control means after the dial signal is sent out from the dial signal sending means to the caller.

14. An equipment according to claim 11 in which the displaying means has a liquid crystal display on which the telephone number and the recording information are displayed.

15. An equipment according to claim 11 in which the displaying means has a printer in which the telephone number and the recording information are printed out.

16. An equipment according to claim 11 in which the displaying means has a composite voice producer in which a composite voice such as a voice "recorded" is sounded after a telephone number is sounded.

17. An equipment according to claim 1 in which the predetermined set-up time is longer than the cycle interval of the ring signals detected in the ring signal detecting means.

* * * * *